United States Patent [19]

Clement

[11] 3,835,926

[45] Sept. 17, 1974

[54] METHODS FOR SEALING SUBTERRANEAN EARTH FORMATIONS

[75] Inventor: Clarence C. Clement, Jr., Odessa, Tex.

[73] Assignee: Halliburton Company, Duncan, Okla.

[22] Filed: Aug. 13, 1973

[21] Appl. No.: 387,881

[52] U.S. Cl. .................................. 166/292, 106/76
[51] Int. Cl. ......................................... E21b 33/138
[58] Field of Search ......... 166/292, 293; 106/76, 89

[56] References Cited
UNITED STATES PATENTS

| | | | |
|---|---|---|---|
| 1,547,189 | 7/1925 | Wilson | 166/292 |
| 2,224,120 | 12/1940 | Hart | 166/293 |
| 2,705,050 | 3/1955 | Davis et al. | 166/293 |
| 2,806,530 | 9/1957 | Binkley | 166/292 |
| 2,985,239 | 5/1961 | Shell | 106/76 X |
| 3,028,913 | 4/1962 | Armentrout | 166/292 |
| 3,303,882 | 2/1967 | Browning et al. | 166/292 |
| 3,482,634 | 12/1969 | Cox | 166/292 |
| 3,499,491 | 3/1970 | Wyant et al. | 166/292 |
| 3,672,173 | 6/1972 | Paramore et al. | 166/293 |
| 3,679,001 | 7/1972 | Hill | 166/292 |

*Primary Examiner*—Stephen J. Novosad
*Attorney, Agent, or Firm*—Thomas R. Weaver; Fred E. Hook; John H. Tregoning

[57] ABSTRACT

This invention relates to cement compositions having thixotropic properties and to squeeze cementing methods of sealing subterranean earth formations using such compositions.

11 Claims, No Drawings

METHODS FOR SEALING SUBTERRANEAN EARTH FORMATIONS

Squeeze cementing is a well known procedure in the art relating to drilling, completing and producing oil, gas and water wells. Squeeze cementing techniques are commonly utilized for a variety of purposes including the plugging or shutting off of undesirable producing formations penetrated by the well bore, the plugging of holes in casings and liners, the isolation of one producing formation from another, etc. Generally, the primary goal of a squeeze cementing operation is to obtain a positive and permanent seal between the well bore and the subterranean earth formation surrounding the well bore at a desired location therein.

A problem frequently encountered in carrying out squeeze cementing operations in highly permeable or porous formations is that the formation readily accepts the cement composition utilized causing it to flow away from the well bore prior to setting. Often such formations absorb all of the cement introduced therein due to the very low resistance to the flow of cement preventing a positive seal from being obtained.

While a variety of methods and special cement compositions have been developed and utilized in squeeze cementing operations to overcome the problems associated with cementing highly permeable or porous formations, they generally suffer from the disadvantage that large quantities of cementing, bridging or other materials are required, the materials employed are expensive and/or the procedures which must be employed for carrying out the cementing operations are costly and involve long delays in the well producing or drilling operations.

By the present invention, methods and compositions for sealing subterranean earth formations are provided, the use of which result in the obtaining of a positive seal even in different formations having extremely low resistance to the flow of cement and which can be carried out with a minimum of expense and delay.

The methods of the present invention for sealing subterranean earth formations broadly comprise introducing into the formation a cement composition having thixotropic properties, i.e., properties such that the cement composition will not set while being pumped or agitated, but will rapidly set when allowed to come to rest. Upon flowing into the formation to be sealed, the cement composition reaches a static condition and quickly sets into a hard impermeable mass.

The novel cement compositions of the present invention which have the desired thixotropic properties mentioned above are basically comprised of cement, a silicate compound, a base, a salt and sufficient water to form the composition into a pumpable slurry. Suitable cements for use in the composition include the various hydraulic cements commonly used in well cementing operations which contain lime, silica, magnesia, alumina and/or iron oxide. Hydraulic limes, pozzolan cements, high alumina cement and Portland cement can be used with Portland cement being preferred. Of the eight classes of cement specified by the American Petroleum Institute (API), Classes A, B, C, G or H are most suitable. Of these, Classes C and H are preferred with Class C being the most preferred.

A wide variety of silicate compounds can be utilized in the thixotropic cement compositions of the present invention. The alkali metal silicates, e.g., sodium, potassium, lithium, rubidium or cesium silicate are preferred. Sodium silicate is the most preferred silicate compound for use in accordance with the present invention, and of the many forms in which sodium silicate exists, those having an $Na_2O:SiO_2$ weight ratio into the range of from about 1:2 to about 1:4 are preferred. Specifically preferred materials are those aqueous sodium silicates having an $Na_2O:SiO_2$ weight ratio of about 1:3.22.

A variety of bases can be employed in the cement composition of the present invention which function to retard the premature gellation of the silicate compound when mixed with cement. Examples of bases which can be utilized are ammonium hydroxide, sodium hydroxide, potassium hydroxide and other alkali metal hydroxides. The most preferred base is sodium hydroxide.

Salts which are useful in the cement compositions of the present invention are those which function to reduce the viscosity of the composition without appreciably affecting the set time thereof. Examples of preferred salts are sodium chloride and potassium chloride with sodium chloride being the most preferred.

A preferred cement composition is comprised of hydraulic cement, a silicate compound present in the composition in an amount in the range of from about 6 percent to about 18 percent by weight of dry cement, an alkali metal hydroxide present in an amount in the range of from about 0.5 percent to about 6 percent by weight of dry cement, salt present in an amount in the range of from about 0.5 percent to about 30 percent by weight of dry cement and water present in an amount sufficient to form the composition into a pumpable slurry.

A more specific preferred cement composition of the present invention having desired thixotropic properties is comprised of hydraulic cement of the API C or H Class, sodium silicate present in an amount in the range of from about 6 percent to about 10 percent by weight of dry cement, sodium hydroxide present in an amount in the range of from about 0.5 percent to about 6 percent by weight of dry cement, sodium chloride present in an amount in the range of from 0.5 percent to about 6 percent by weight of dry cement and water present in an amount sufficient to form the composition into a pumpable slurry.

At silicate concentrations in the cement composition of less than about 6 percent by weight of dry cement used, the compressive strength of the composition after setting is reduced. While silicate concentrations up to about 18 percent by weight of dry cement can be used, sodium silicate concentrations above about 10 percent by weight of dry cement result in variations in the time required for the composition to set after it is allowed to come to rest.

Below a concentration of alkali metal hydroxide in the composition of about 0.5 percent by weight of dry cement used, the silicate and cement are incompatible and a gel is formed upon mixing. At concentrations above about 6 percent by weight of dry cement utilized, the time required for the composition to set after it comes to rest is increased appreciably. Concentrations of sodium hydroxide in the composition in the range of from about 0.5 percent to about 6 percent by weight of dry cement result in the desired static composition set time, i.e., from about ten to about thirty minutes.

Salt concentrations varying from about 0.5 to about 30 percent by weight of dry cement can be used in the cement composition with good results. The salt thins the cement composition and allows a high density slurry to be pumped. When sodium chloride is used, a concentration in the range of from about 0.5 percent to about 6 percent by weight of dry cement used is preferred. In order to form a pumpable slurry having a density above about 12.5 pounds per gallon, a sodium chloride concentration in the range of from about 0.5 to about 6 percent by weight of cement used is required. At sodium chloride concentrations above about 6 percent by weight of cement the set time of the composition is increased.

While the concentration of water required in the cement compositions of the present invention will vary depending upon the type of materials utilized in the composition as well as the desired density of the mixed slurry, a concentration in the range of from about 50 to about 110 percent by weight of dry cement used is generally required. A water concentration below about 50 percent often results in a slurry which is too thick to be readily pumpable, and at water concentrations above about 110 percent by weight of dry cement used, excess water is present.

A specific preferred thixotropic cement composition of the present invention is comprised of API Class C hydraulic cement, sodium silicate having a $Na_2O:SiO_2$ weight ratio of about 1:3.22 present in an amount of about 6.5 percent by weight of dry cement, sodium hydroxide present in an amount of about 1.1 percent by weight of dry cement, sodium chloride present in an amount of about 1.1 percent by weight of dry cement, and water present in an amount of about 58.6 percent by weight of dry cement. This composition has a density of about 14.5 pounds per gallon and is pumpable as long as the slurry is being moved or agitated. The thixotropic or gelling properties of the slurry provide a rapid set and strength build-up when not agitated or moved. The slurry can be pumped for long periods of time, e.g., several hours, without setting but when agitation is stopped for more than about 5 minutes the slurry rapidly forms a rigid gel. After a static period of about 5 to 10 minutes, but before about 30 minutes, the gel can be sheared thin and pumped at relatively low displacement pressures. If the static period exceeds about thirty minutes, the gel is rigid and cannot be sheared thin at reasonable displacement pressures.

In preparing the cement compositions of the present invention having thixotropic properties, the base, salt and silicate are preferably first dissolved in a portion of the water to be used. The cement is next initially mixed with the remaining portion of the water, and then the first portion containing the silicate, base and salt is combined with the cement-water mixture to form the final slurry. If more convenient, the salt can be mixed with the cement rather than dissolved in the first portion of water. This preparation technique insures that the silicate is mixed with the cement in the presence of the base which prevents premature gellation of the cement composition.

Sodium silicate is readily commercially available in aqueous solutions of various grades, which are conveniently utilized in preparing the cement compositions of the present invention. A commercially available aqueous sodium silicate solution having a density of 11.67 pounds/gallon, an $Na_2O:SiO_2$ weight ratio of about 1:3.22 (Grade 40) and having the following analysis is preferred:

| Component | Percent by Weight |
|---|---|
| $Na_2O$ | 9.1 |
| $SiO_2$ | 29.2 |
| Water | 61.7 |
|  | 100.0 |

In using the novel thixotropic cement compositions of the present invention for sealing subterranean earth formations, a specific quantity of the cement composition is prepared and introduced through the well bore into the formation to be sealed. As the cement slurry enters the formation, it reaches a static condition and rapidly sets into a high strength gel. The rapid and extreme gellation of the slurry in the formation upon reaching a static condition brings about displacement of water contained in the formation ahead of the slurry thereby minimizing dilution and thinning of the composition prior to when it sets, a common problem encountered when squeeze cementing with conventional cement slurries.

In carrying out squeeze cementing operations such as sealing a zone of lost circulation or shutting off a water producing formation, the introduction of the cement composition into the formation may be hesitated at intervals so that the portions of the cement composition already in the formation are allowed to start to set before being displaced by additional incoming cement. As mentioned previously, as long as the cement composition is not allowed to stay at rest for periods over about ten minutes, its thixotropic properties will bring about the return to a pumpable slurry after displacement.

In order to promote bridging in the formation, conventional bridging agents can be included in the cement composition of this invention. Examples of such bridging agents which do not affect the properties of the cement composition are gilsonite and sand. Other conventional additives such as lost circulation material can also be utilized in the cement compositions of the present invention.

In order to further illustrate the invention and present a clear understanding thereof, the following examples are given:

Example 1

Tests are conducted in the laboratory of the type described in the American Petroleum Institute publication entitled "API Recommended Practice For Testing Oil Well Cements and Cement Additives" (Section 7, API RP 10-B, 17th Ed., April 1971). The test apparatus includes a rotating cylindrical slurry container equipped with a stationary paddle assembly, all enclosed in a pressure chamber capable of withstanding the pressures and temperatures described hereinbelow. The space between the slurry container and the walls of the pressure container are completely filled with white mineral oil, and the heating element capable of raising the temperature of the oil bath at the rate of at least 5°F (3°C) per minute is provided. Thermocouples are provided for determining the temperature of the cement slurry, and the consistency of the cement slurry is determined by rotating the slurry container at a speed of 150 rpm and determining the force applied to the stirring paddle by the cement slurry as it is rotated.

Various thixotropic cement compositions of the present invention are prepared by mixing, in the quantities shown in Table I below, API Class C hydraulic cement, commercially available Grade 40 sodium silicate having an $Na_2O:SiO_2$ weight ratio of about 1:3.22, sodium hydroxide, sodium chloride and water. The water, sodium silicate and sodium hydroxide are mixed together first and then added to the cement and sodium chloride.

For comparison purposes, the various cement compositions are subjected to the 8,000 ft. and 14,000 ft. Casing-Cementing Well-Simulation Tests set forth in the API RP 10-B publication mentioned above at the conditions specified therein except that the compositions are each subjected to simulated pumping by rotating the slurry container for one hour, and if not thickened or set, allowed to stand in a static state for one hour at the end of which time the condition of the cement composition is noted.

Information concerning the various compositions tested and the thickening time data relating thereto are set forth in Table I below:

It will be understood by those skilled in the art that considerable variation in the components of the cement compositions of the present invention as well as in the methods of using the compositions can be made and this invention is not to be limited to the specific examples which are given herein for the purpose of disclosure.

What is claimed is:

1. A method of sealing a subterranean earth formation which comprises the steps of:

introducing a cement composition having thixotropic properties into said formation, the cement composition being comprised of hydraulic cement, a silicate compound present in an amount in the range of from about 6 percent to about 18 percent by weight of dry cement, an alkali metal hydroxide present in an amount in the range of from about 0.5 percent to about 6 percent by weight of dry cement, salt present in an amount in the range of from about 0.5 percent to about 30 percent by weight of dry cement, and water present in an amount sufficient to form said composition into a pumpable slurry; and allowing said composition to set into a hard impermeable mass in said formation.

TABLE I
COMPARISON OF VARIOUS CEMENT COMPOSITIONS AFTER BEING SUBJECTED TO SIMULATED PUMPING FOR 1 HOUR

| Cement Composition Components, Percent By Weight of Dry Cement | | | | Cement Composition Density, Lbs/Gal | Condition At End Of 1 Hour Simulated Pumping | | Condition After Being At Rest 1 Hour | |
|---|---|---|---|---|---|---|---|---|
| Sodium Silicate | Sodium[2] Hydroxide | Sodium Chloride | Water | | 8,000 ft. Casing-Cementing Well-Simulation Test | 14,000 ft. Casing-Cementing Well-Simulation Test | 8,000 ft. Casing-Cementing Well-Simulation Test | 14,000 ft. Casing-Cementing Well-Simulation Test |
| 13.5 | 2.1 | 2.5 | 120.0[1] | 12.5 | Same as at start of test. | Same as at start of test. | Set | Set |
| 17.1 | 2.1 | 29.5 | 156.1[1] | 12.5 | Same as at start of test. | Same as at start of test. | Not Set | Set |
| 10.3 | 2.1 | 1.9 | 94.0 | 13.25 | Same as at start of test. | Same as at start of test. | Set | Set |
| 12.6 | 2.1 | 20.9 | 113.8[1] | 13.25 | Same as at start of test. | Same as at start of test. | Not Set | Set |
| 8.3 | 2.1 | 1.5 | 75.0 | 14.0 | Same as at start of test. | Same as at start of test. | Set | Set |
| 9.6 | 2.1 | 15.4 | 87 | 14.0 | Same as at start of test. | Same as at start of test. | Set | Set |

[1] Excess water present in composition.
[2] The cement compositions used in the 8,000 ft. Casing-Cementing Well-Simulation Tests included sodium hydroxide in an amount of 1.1 percent by weight of dry cement.

The data given in Table I are clearly illustrative of the thixotropic and quick-setting properties of the cement compositions of the present invention.

Example 2

The various cement compositions described in Example 1 above are tested for compressive strength in a conventional manner after curing for the times and at the temperatures indicated in Table II below:

2. The method of claim 1 wherein the hydraulic cement is of the API C or H Class, the silicate compound is sodium silicate present in an amount in the range of from about 6 percent to about 10 percent by weight of dry cement, the alkali metal hydroxide is sodium hydroxide present in an amount in the range of from about 0.5 percent to about 6 percent by weight of dry cement, and the salt is sodium chloride present in an amount in the range of from about 0.5 percent to about

TABLE II

| COMPRESSIVE STRENGTH DATA | | | | | | |
|---|---|---|---|---|---|---|
| Cement Composition Components, Percent By Weight of Dry Cement | | | | Cement Composition Density, Lbs/Gal | Compressive Strength After 7 Days, psi | |
| Sodium Silicate | Sodium Hydroxide | Sodium Chloride | Water | | Cured At 200°F | Cured At 290°F |
| 13.5 | 2.1 | 2.5 | 120.0[1] | 12.5 | 325 | 75 |
| 17.1 | 2.1 | 29.5 | 156.1[1] | 12.5 | 130 | 30 |
| 10.3 | 2.1 | 1.9 | 94.0 | 13.25 | 210 | 80 |
| 12.6 | 2.1 | 20.9 | 113.8[1] | 13.25 | 195 | 35 |
| 8.3 | 2.1 | 1.5 | 75.0 | 14.0 | 260 | 125 |
| 9.6 | 2.1 | 15.4 | 87 | 14.0 | 290 | 145 |

[1]Excess water present in composition.

6 percent by weight of dry cement.

3. The method of claim 2 wherein the water is present in the cement composition in an amount in the range of from about 50 percent to about 110 percent by weight of dry cement.

4. The method of claim 3 wherein the sodium silicate present in the composition has a $Na_2O:SiO_2$ weight ratio of about 1:3.22.

5. The method of claim 4 wherein the sodium silicate is present in an amount of about 6.5 percent by weight of dry cement, the sodium hydroxide is present in an amount of about 1.1 percent by weight of dry cement, the sodium chloride is present in an amount of about 1.1 percent by weight of dry cement, and the water is present in an amount of about 58.6 percent by weight of dry cement.

6. A method of sealing a subterranean earth formation penetrated by a well bore which comprises the steps of:
preparing a cement composition having thixotropic properties comprised of hydraulic cement, a silicate compound present in an amount in the range of from about 6 percent to about 18 percent by weight of dry cement, an alkali metal hydroxide present in an amount in the range of from about 0.5 percent to about 6 percent by weight of dry cement, salt present in an amount in the range of from about 0.5 percent to about 30 percent by weight of dry cement, and water present in an amount sufficient to form said composition into a pumpable slurry;
pumping the cement composition through said well bore into the formation to be sealed; and
allowing said cement composition to set into a hard impermeable mass in the formation.

7. The method of claim 6 wherein the hydraulic cement is of the API C or H Class, the silicate compound is sodium silicate present in an amount in the range of from about 6 percent to about 10 percent by weight of dry cement, the alkali metal hydroxide is sodium hydroxide present in an amount in the range of from about 0.5 percent to about 6 percent by weight of dry cement, and the salt is sodium chloride present in an amount in the range of from about 0.5 percent to about 6 percent by weight of dry cement.

8. The method of claim 7 wherein the water is present in the cement composition in an amount in the range from about 50 percent to about 110 percent by weight of dry cement.

9. The method of claim 8 wherein the sodium silicate present in the composition has a $Na_2O:SiO_2$ weight ratio of about 1:3.22.

10. The method of claim 9 wherein the sodium silicate is present in an amount of about 6.5 percent by weight of dry cement, the sodium hydroxide is present in an amount of about 1.1 percent by weight of dry cement, the sodium chloride is present in an amount of about 1.1 percent by weight of dry cement, and the water is present in an amount of about 58.6 percent by weight of dry cement.

11. The method of claim 9 wherein the step of preparing said cement composition includes:
a. dissolving the sodium hydroxide, sodium chloride and sodium silicate in the water; and then
b. combining the resultant solution with the cement.

* * * * *